US012361626B2

(12) United States Patent
Huang et al.

(10) Patent No.: US 12,361,626 B2
(45) Date of Patent: Jul. 15, 2025

(54) SUBTITLE PROCESSING METHOD AND APPARATUS

(71) Applicant: Beijing Zitiao Network Technology Co., Ltd., Beijing (CN)

(72) Inventors: Xuehang Huang, Beijing (CN); Zhanpeng Huang, Beijing (CN); Zhiyun Yu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/543,836

(22) Filed: Dec. 18, 2023

(65) Prior Publication Data

US 2024/0119654 A1   Apr. 11, 2024

Related U.S. Application Data

(63) Continuation of application No. PCT/CN2023/118772, filed on Sep. 14, 2023.

(30) Foreign Application Priority Data

Sep. 14, 2022   (CN) .......................... 202211117721.1

(51) Int. Cl.
*G06F 3/048*   (2013.01)
*G06T 11/20*   (2006.01)
*G06T 13/80*   (2011.01)

(52) U.S. Cl.
CPC ............ *G06T 13/80* (2013.01); *G06T 11/203* (2013.01)

(58) Field of Classification Search
CPC .............................. G06T 13/80; G06T 11/203
See application file for complete search history.

(56) References Cited

U.S. PATENT DOCUMENTS 10,564,991 B2 * 2/2020 Kotlicki ................. G06F 16/64
10,650,861 B2 * 5/2020 Yoon ...................... G11B 27/19
(Continued)

FOREIGN PATENT DOCUMENTS

| CN | 103139375 A | 6/2013 |
| CN | 108419113 A | 8/2018 |

(Continued)

OTHER PUBLICATIONS

European Search Report for EP Patent Application No. 23820731.0, Issued on Sep. 12, 2024, 9 pages.

(Continued)

*Primary Examiner* — David Phantana-angkool

(57) ABSTRACT

The present disclosure relates to a subtitle processing method, a subtitle processing apparatus and an electronic device, wherein the method includes: performing, in a process of editing multimedia material, speech recognition on an audio corresponding to the multimedia material to obtain a subtitle text corresponding to the audio and timestamp information of audio fragments corresponding to respective text elements in the subtitle text; determining material fragments in the multimedia material fragment respectively matching with the text elements according to the timestamp information of the audio fragments respectively corresponding to the respective text elements; and synthesizing the respective text elements respectively with material fragments in a matching time period, to obtain a target multimedia material with an animation effect in which the subtitle text jumps out word by word.

18 Claims, 9 Drawing Sheets

(56) References Cited

U.S. PATENT DOCUMENTS

| | | | |
|---|---|---|---|
| 2004/0234250 A1 | 11/2004 | Cote et al. | |
| 2018/0143974 A1* | 5/2018 | Skarbovsky | G06F 40/58 |
| 2019/0172166 A1* | 6/2019 | Evans | H04N 21/41407 |
| 2019/0392866 A1* | 12/2019 | Yoon | G11B 27/28 |
| 2021/0160583 A1 | 5/2021 | Hirtzel et al. | |
| 2021/0168460 A1 | 6/2021 | Lee et al. | |
| 2021/0289250 A1 | 9/2021 | Yang et al. | |
| 2021/0319781 A1* | 10/2021 | Gullo | G06F 40/166 |
| 2022/0319552 A1* | 10/2022 | Collins | H04N 5/783 |
| 2023/0321529 A1* | 10/2023 | Sundareson | G06V 10/763 463/31 |
| 2023/0326490 A1* | 10/2023 | Collins | H04N 21/2743 386/241 |
| 2024/0070565 A1* | 2/2024 | Cohen | G09B 7/06 |
| 2024/0143900 A1* | 5/2024 | Wolfston, Jr. | H04L 12/1831 |
| 2024/0153536 A1* | 5/2024 | Zhang | G11B 27/34 |
| 2024/0249751 A1* | 7/2024 | Zeng | G11B 27/031 |
| 2024/0290353 A1* | 8/2024 | Ma | G11B 27/031 |

FOREIGN PATENT DOCUMENTS

| | | | |
|---|---|---|---|
| CN | 109246472 A | 1/2019 | |
| CN | 109257547 A | 1/2019 | |
| CN | 110798636 A | 2/2020 | |
| CN | 110996167 A | 4/2020 | |
| CN | 111010614 A | 4/2020 | |
| CN | 112702659 A | 4/2021 | |
| CN | 115209211 A | 10/2022 | |
| JP | 2006119534 A | 5/2006 | |
| JP | 2007027990 A | 2/2007 | |
| JP | 2021170803 A | 10/2021 | |

OTHER PUBLICATIONS

Communication pursuant to Rules 70(2) and 70a(2) EPC for European Application No. 23820731.0, mailed Oct. 1, 2024, 1 page.

Notice of Reasons for Refusal for Japanese Application No. 2023-577874, mailed on Nov. 26, 2024, 7 pages.

International Search Report and Written Opinion for International Application No. PCT/CN2023/118772, mailed Dec. 11, 2023, 11 pages.

Decision of Refusal issued in JP Appl. NO. 2023577874 dated May 1, 2025 English translation (9 pages).

Nagata Y., BlogFlashMobile phone holding and challenge again homepage creation [Revenge edition], PCfan, Mainichi Communications Co., Ltd., Mar. 15, 2005, vol. 12, No. 5, pp. 102-10.

Kazuaki Takagi., After Effects Reverse Design Dictionary [CCCS6], Aug. 2, 2008, pp. 414-143.

* cited by examiner

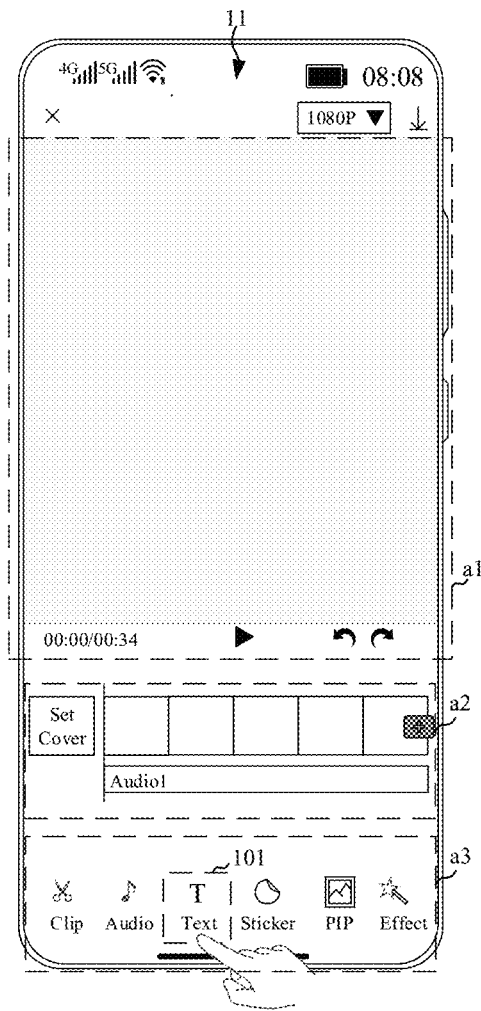
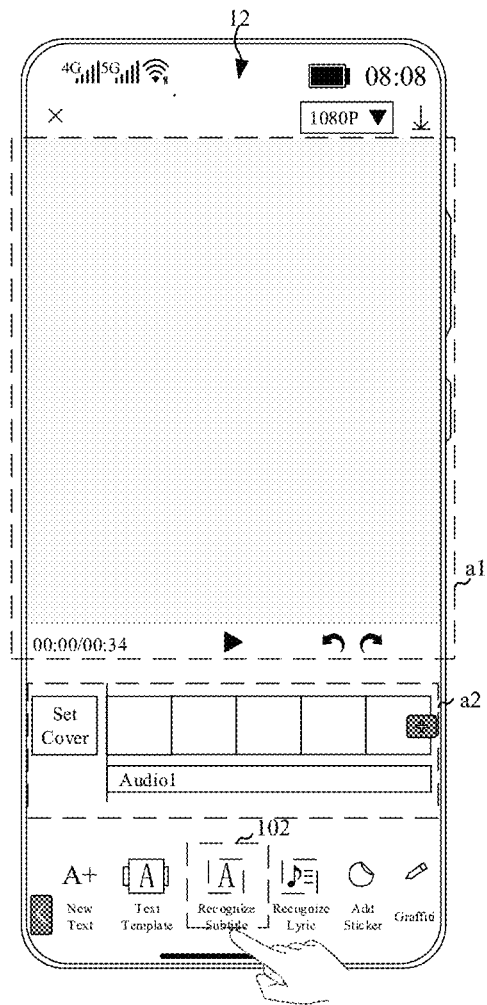
Fig. 4A                              Fig. 4B

SUBTITLE PROCESSING METHOD AND APPARATUS

CROSS-REFERENCE TO RELATED APPLICATION

The present application is a continuation of International Patent Application No. PCT/CN2023/118772, filed on Sep. 14, 2023, which claims the priority of Chinese Patent Application No. 202211117721.1 filed on Sep. 14, 2022, and the entire content disclosed by the Chinese patent application is incorporated herein by reference as part of the present application.

TECHNICAL FIELD

The embodiments of the present disclosure relate to a subtitle processing method and apparatus.

BACKGROUND

A subtitle in a video can assist the understanding of the video's content, therefore the subtitle is often added when editing the video.

At present, manual input subtitle texts or subtitle recognition tools are usually employed to identify a corresponding audio to obtain subtitle texts, and then by repeatedly listening to the audio, the subtitle texts are adjusted and segmented to obtain a large amount of text fragments, which are synthesized with the video so that the subtitle is added to the video. For batch text scenarios such as the subtitle, if a user wants to achieve a certain expected subtitle effect, he/she needs to adjust and synthesize the result of the segmentation of the subtitle texts repeatedly, and preview the effect of the subtitle, so it is inefficient to edit the subtitle in this way.

SUMMARY

In order to solve the above technical problem, the present disclosure provides a subtitle processing method and apparatus.

In a first aspect, an embodiment of the present disclosure provides a subtitle processing method comprising:
performing, in a process of editing multimedia material, speech recognition on an audio corresponding to the multimedia material to obtain a subtitle text corresponding to the audio and timestamp information of audio fragments respectively corresponding to respective text elements included in the subtitle text;
matching the respective text elements with respective material units in the multimedia material according to the timestamp information of the audio fragments respectively corresponding to the respective text elements, and determining material fragments in the multimedia material respectively matching with the respective text elements; wherein a time in an editing timeline of a material fragment matching with a text element is consistent with a time in the editing timeline of an audio fragment corresponding to the text element; and
synthesizing the respective text elements respectively with the material fragments in a matching time range to obtain a target multimedia material with an animation effect in which the subtitle text jumps out word by word.

In a second aspect, an embodiment of the present disclosure provides a subtitle processing apparatus comprising:

a speech recognition module, configured to perform, in a process of editing multimedia material, speech recognition on an audio corresponding to the multimedia material to obtain a subtitle text corresponding to the audio and timestamp information of audio fragments respectively corresponding to respective text elements included in the subtitle text;
a matching module, configured to match the respective text elements with respective material units in the multimedia material according to the timestamp information of the audio fragments respectively corresponding to the respective text elements, and determine material fragments in the multimedia material respectively matching with the respective text elements; wherein a time in an editing timeline of a material fragment matching with a text element is consistent with a time in the editing timeline of an audio fragment corresponding to the text element; and
a subtitle synthesis module, configured to synthesize the respective text elements respectively with material fragments in a matching time range to obtain a target multimedia material with an animation effect in which the subtitle text jumps out word by word.

In a third aspect, an embodiment of the present disclosure provides an electronic device comprising a memory and a processor; the memory is configured to store computer program instructions; the processor is configured to execute the computer program instructions to cause the electronic device to implements the subtitle processing method as described in the first aspect.

In a fourth aspect, an embodiment of the present disclosure provides a readable storage medium comprising computer program instructions, which, when executed by at least one processor of an electronic device, cause the electronic device to implement the subtitle processing method as described in the first aspect.

In a fifth aspect, an embodiment of the present disclosure provides a computer program product, which, when executed by an electronic device, causes the electronic device to implement the subtitle processing method as described in the first aspect.

BRIEF DESCRIPTION OF DRAWINGS

The accompanying drawings, which are incorporated herein and constitute a part of this specification, illustrate embodiments consistent with the present disclosure and together with the description, serve to explain the principles of the present disclosure.

In order to explain the technical scheme of the embodiments of the present disclosure more clearly, the drawings needed for the embodiments will be briefly introduced below. It is apparent for ordinary skilled in the art that other drawings can be obtained according to these drawings without creative efforts.

FIGS. 4A to 4I are schematic diagrams for human-computer interaction interfaces provided by the present disclosure.

DETAILED DESCRIPTION

Figure 1:
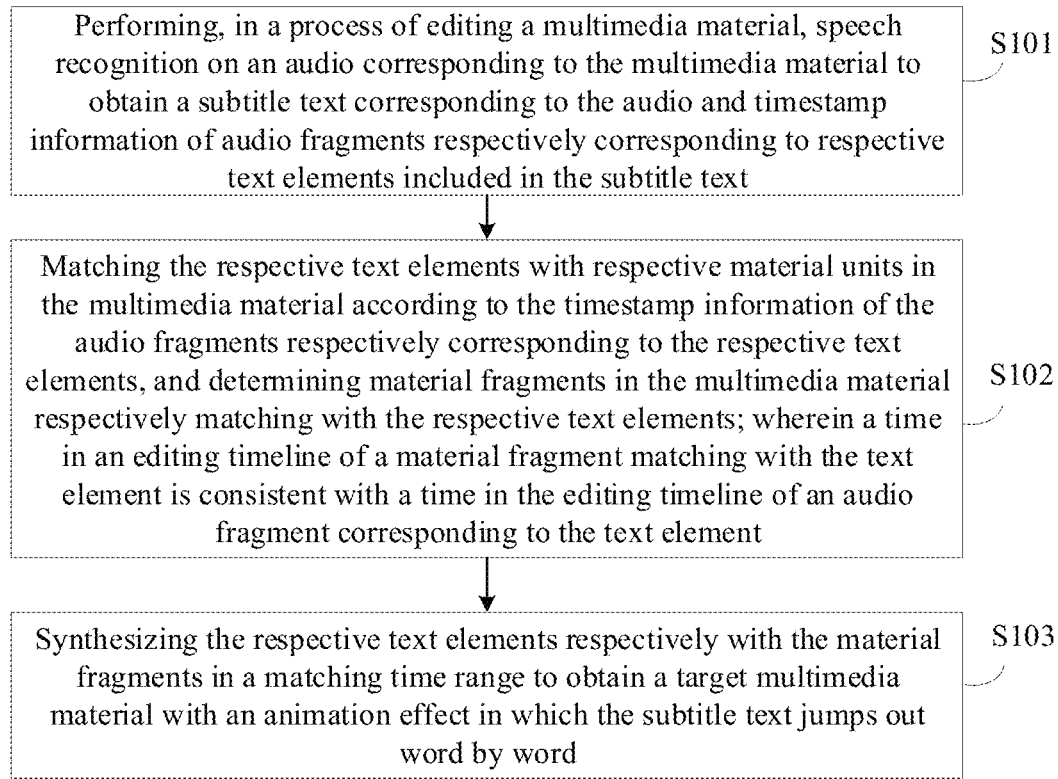
FIG. 1 is a flowchart for a subtitle processing method provided by an embodiment of the present disclosure.

In order to understand the above objectives, features and advantages of the present disclosure more clearly, the schemes of the present disclosure will be further described below. It should be noted that the embodiments of the present disclosure and the features in the embodiments can be combined with each other without conflicts.

In the following description, many specific details are set forth to facilitate fully understanding of the present disclosure, but the present disclosure may be implemented in other ways than those described herein. Obviously, the embodiments in the specification are only part of the embodiments of the present disclosure, not all of them.

A subtitle can assist a user to understand a video's content, and different subtitle effects can further represent content of more dimensions. For example, a text corresponding to a certain word only appears when the word is spoken in the audio for the video. Such subtitle effects are often used to express voice-over in the vertical classification of plot deduction, and are often used to express the speaker's confident and passionate emotions in the vertical classification of talking. The above-mentioned specific subtitle effects are achieved often by user manually inputting a subtitle, segmenting the subtitle text into individual words, and then listening to the speech repeatedly to make adjustments. In addition, an effect of text appearing one by one can be achieved by user inputting a completed statement and using the key frame mask approach. As such, not only the editing of the subtitle is inefficiency, but also the operations on the mobile terminal is extremely inconvenient.

Based on this, the embodiments of the present disclosure provide a subtitle processing method and apparatus, wherein the method comprises: performing, in a process of editing multimedia material, speech recognition on an audio corresponding to the multimedia material to obtain a subtitle text corresponding to the audio and timestamp information of audio fragments respectively corresponding to respective text elements in the subtitle text; determining material fragments in the multimedia material respectively matching with the text elements according to the timestamp information of the audio fragments respectively corresponding to the respective text elements; and synthesizing the respective text elements respectively with material fragments in a matching time period to obtain a target multimedia material with an animation effect in which the subtitle text jumps out word by word. In the present disclosure, the starting moment of the time range of a video frame image matching the text element is consistent with the starting moment of an audio fragment corresponding to the text element, so that a subtitle animation effect in which a text subtitle corresponding to a certain word appears as the certain word is spoken can be achieved. In addition, automatic generation of dynamic subtitle can be implemented by user inputting instructions, and the user's operation is simple, which is beneficial to improving user's experience. Moreover, the method of the present disclosure can be applied to various types of devices and has a wide range of application.

The method provided by the present disclosure can be executed by electronic device, which can be, but is not limited to, tablet computer, mobile phone (such as a folding screen mobile phone, a large screen mobile phone, etc.), wearable device, vehicle-mounted device, augmented reality (AR)/virtual reality (VR), VR) device, notebook computer, ultra-mobile personal computer (UMPC), netbook, personal digital assistant (PDA), etc. The present disclosure does not impose any limitations on the specific type of electronic device.

FIG. 1 is a flowchart for a subtitle processing method provided by an embodiment of the present disclosure. Taking an example for illustration in which the method of this embodiment is executed by an electronic device, a type of application program for editing is installed in the electronic device, and users can edit multimedia material through the application program. As shown in FIG. 1, the method of this embodiment comprises:

S101: performing, in a process of editing multimedia material, speech recognition on an audio corresponding to the multimedia material to obtain a subtitle text corresponding to the audio and timestamp information of audio fragments respectively corresponding to respective text elements included in the subtitle text.

The multimedia material may be a video material recorded by the user in real time, a previously edited video material, or a video material stored in the electronic device, which is not limited by the present disclosure. The multimedia material may also be an audio material, an image material, etc., and the present disclosure does not limit the type of the multimedia material. Moreover, the present disclosure doesn't impose limitations on the number of multimedia materials. If there are a plurality of multimedia materials, the plurality of multimedia materials may be arranged according to an importing order and may be regarded as a whole.

The process of editing multimedia material can be understood as pre-recording or importing multimedia material or an audio material with an audio, or alternatively, adding a background music to the multimedia material (such as video material, image material, etc.). Of course, the method for editing is not limited to this.

A subtitle text is obtained by performing text recognition on an audio corresponding to the multimedia material currently being edited, wherein the audio corresponding to the multimedia material may be an original audio included in the multimedia material or a background music added by the user to the multimedia material. The background music may be an audio in an application program, such as a complete song, or a partial fragment of a song, or a clipped audio fragment, etc., which is not limited by the present disclosure. When the multimedia material is an audio material, speech recognition may be performed on the multimedia material itself.

In some embodiments, the application program may send, through the electronic device, an audio to a middle end service, which calls a subtitle recognition tool to perform text recognition on the audio to obtain a corresponding subtitle text and timestamp information of audio fragments corresponding to respective text elements in the subtitle text. The timestamp information may include the starting moment and the ending moment of the audio fragment.

For example, in case that the total duration of the audio corresponding to the multimedia material fragment is 7 seconds, and the subtitle text obtained by performing speech recognition on the audio is "I had a very good time today", which is in total of 7 text elements, the duration of the audio fragment corresponding to each of the text elements is 1 second. Therefore, the correspondence between respective text elements and the timestamp information of the corresponding audio fragments is shown in the following Table 1:

TABLE 1

| Text Element | Timestamp Information of Audio Fragment |
|---|---|
| I | 00:00-00:01 |
| had | 00:01-00:02 |
| a | 00:02-00:03 |
| very | 00:03-00:04 |
| good | 00:04-00:05 |
| time | 00:05-00:06 |
| today | 00:06-00:07 |

In the above example, the audio is in English in terms of its language, and the corresponding text elements are in units of English words. If the audio is in another language, the text elements are in units of corresponding words. For example, if the audio is in Chinese, the text elements are in units of Chinese characters.

In some embodiments, the application program may perform speech recognition in response to an instruction input by the user. The present disclosure does not impose limitation on the implementation of the instruction triggering speech recognition. In some embodiments, the instruction for speech recognition may include operations such as, but are not limited to, clicking, double clicking, long pressing, sliding and the like. For example, when a page of the application program is provided with an area/control corresponding to adding a recognized subtitle to the multimedia material, the instruction for speech recognition may be an operation received on this area/control.

S102: matching the respective text elements with respective material units in the multimedia material according to the timestamp information of the audio fragments respectively corresponding to the respective text elements, and determining material fragments in the multimedia material respectively matching with the respective text elements; wherein a time in an editing timeline of a material fragment matching with the text element is consistent with a time in the editing timeline of an audio fragment corresponding to the text element.

If the multimedia material is an image material/a video material, a material fragment in the multimedia material matching a text element can be understood as an image fragment/a video fragment, and the material fragment includes an image frame/a video frame to be synthesized with the text element. If the multimedia material is an audio material, a material fragment in the multimedia material matching a text element can be understood as an audio fragment, and the material fragment includes one or more phonetic units to be synthesized with the text element.

Since the subtitle processing method provided by the present disclosure intends to achieve a subtitle effect in which a text subtitle corresponding to a certain word appears as the certain word is spoken, in determining matching material fragments according to the timestamp information of the audio fragments corresponding to the respective text elements, a time in the editing timeline of an audio fragment corresponding to a text element is consistent with a time in the editing timeline time of a material fragment.

Here, being consistent in the editing timeline can be understood as that the starting moment in the editing timeline of a material fragment matching a text element is consistent with the starting moment in the editing timeline of an audio fragment corresponding to the text element.

However, a time point at which the text elements in the subtitle disappear can be flexible and changeable. The text elements may disappear at the end of the audio fragment corresponding thereto, or alternatively, they may disappear at the end of the statement to which they belong (or a text fragment with a specified length), or alternatively, they may disappear at a lapse of a preset period after the end of the audio fragment corresponding thereto, which is not limited by the present disclosure.

Therefore, in the editing timeline, the ending moment of a time period corresponding to a material fragment that matches with a text element may be the same as the ending moment of an audio fragment corresponding to the text element. In this way, the subtitle text has an animation effect of jumping out word by word, and the text element occurring previously may disappear as its corresponding audio fragment reaches the ending moment.

The ending moment of a time range to which a video frame image matching with a text element belong may be later than the ending moment of an audio fragment corresponding to the text element. In this way, the text elements may appear one by one, and the previous text element may remain for a period of time after the end of its corresponding audio fragment, and then disappear.

The speed at which the text elements switch depends on the speech speed of the pronouncing subject in the audio.

S103: synthesizing the respective text elements respectively with the material fragments in a matching time range to obtain a target multimedia material with an animation effect in which the subtitle text jumps out word by word.

When synthesizing a text element with a matching material fragment, a preset first subtitle animation style may be used for the text element, and a subtitle automatically added to the multimedia material, when generated, automatically has a subtitle effect corresponding to the first subtitle animation style, so as to meet the user's requirement for the subtitle effect and reduce the user's later operation. The first subtitle animation style may include one or more of how a text element appears, how the text element disappears, and how the text element loops.

Steps S102 and S103 may be automatically implemented by calling a dynamic subtitle resource package (also referred to as a subtitle animation resource package), wherein the subtitle text and the timestamp information of respective text elements included in the subtitle text are imported into the dynamic subtitle resource package, which applies preset subtitle animation styles to the respective text elements in batches, and superposes the text elements with the preset subtitle animation styles on matching material fragments, so that a subtitle with an animation effect in which the subtitle text jumps out word by word in the first subtitle animation style is added to the multimedia material.

The method of this embodiment can achieve a subtitle animation effect in which a text subtitle corresponding to a certain word appears as the certain word is spoken. In addition, automatic generation of a dynamic subtitle can be implemented by inputting instructions by the user, and the user's operation is simple, which is beneficial to improving user's experience. Moreover, the method of this embodiment can be applied to various types of devices and has a wide range of application. In a batch text scenario, even a mobile device with a relatively small screen can quickly add a subtitle with a specified effect to a multimedia material fragment.

Figure 2:
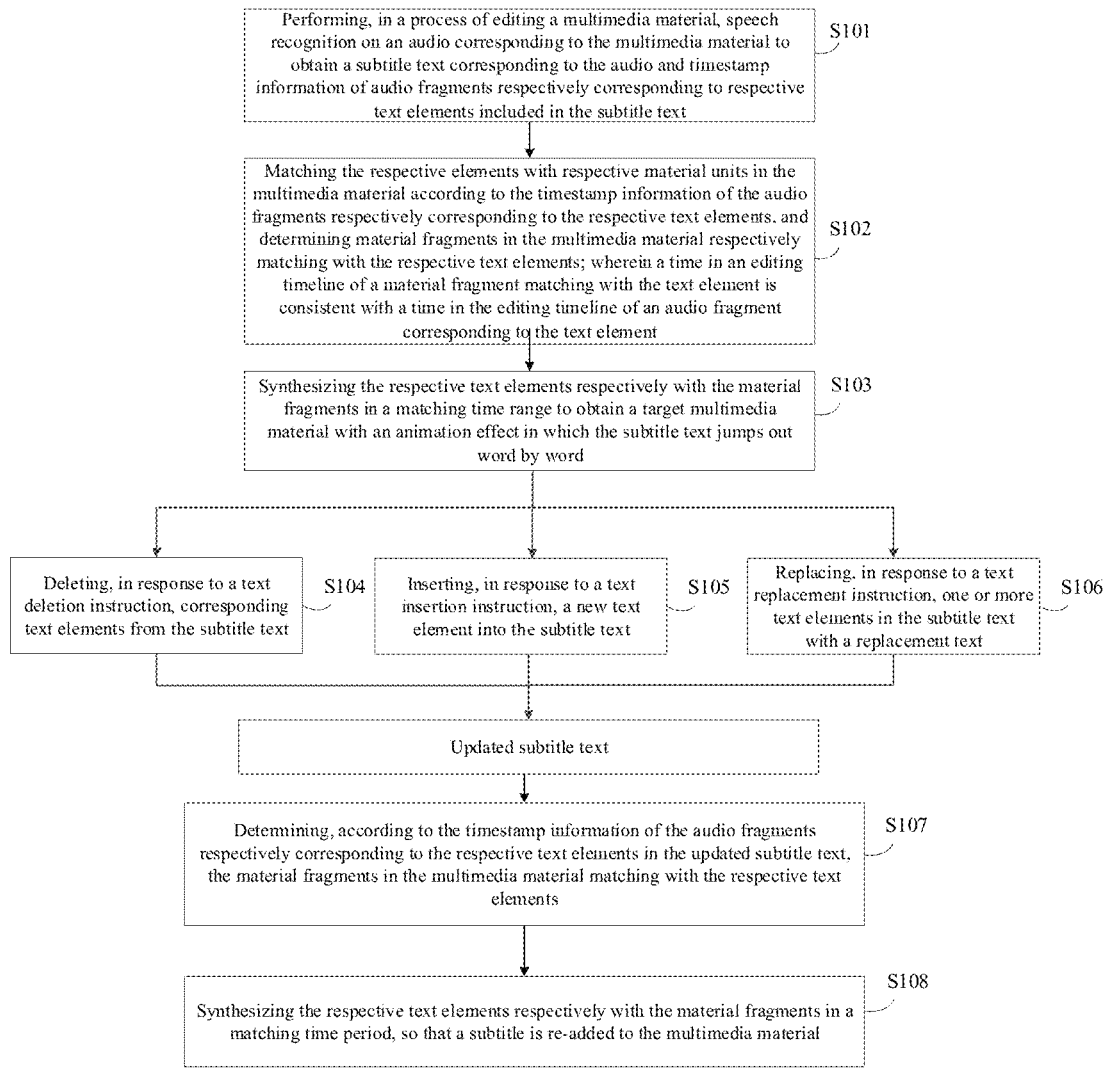
FIG. 2 is a flowchart for a subtitle processing method provided by another embodiment of the present disclosure.

After adding the subtitle to the multimedia material fragment by the method of the embodiment shown in FIG. 1, the user may further re-edit the content of the subtitle text, wherein the re-editing may be but not limited to deleting a text element, inserting a new text element and replacing a text element. FIG. 2 is a flowchart for a subtitle processing method provided by another embodiment of the present disclosure. Referring to FIG. 2, on the basis of the embodiment shown in FIG. 1, the method of this embodiment further comprises:

S104: deleting, in response to a text deletion instruction, corresponding text elements from the subtitle text to obtain an updated subtitle text.

The updated subtitle text and the timestamp information of respective text elements in the updated subtitle text are obtained by deleting text elements in the subtitle, and keeping the remaining text elements and the timestamp information of the remaining text elements.

For example, it is assumed that the subtitle text before the deleting is: I (00:00-00:01) had (00:01-00:02) a (00:02-00:04) good (00:04-00:05) time (00:05-00:06) today (00:06-00:07), where the brackets indicate the time stamp information of the audio segments corresponding to the text elements.

After deleting the last text element "today", I (00:00-00:01) had (00:01-00:02) a (00:02-00:04) good (00:04-00:05) time (00:05-00:06), where the brackets indicate the time stamp information of the audio segments corresponding to the text elements.

If a text element in another position is deleted, processing may be carried out in a similar way.

S105: inserting, in response to a text insertion instruction, a new text element into the subtitle text to obtain an updated subtitle text.

The text insertion performed in this step is to insert the new text element without deleting the existing text elements in the subtitle text. In some embodiments, different processing approaches can be differently configured according to a position where the new text element is inserted. In some embodiments, if the position where the new text element is inserted is in the middle of the subtitle text or at the end of the text, the new text element is merged with an adjacent previous text element to share the timestamp information of an audio fragment corresponding to the adjacent previous text element; and if a position where the new text element is inserted is at the very beginning of the subtitle text, the new text element is merged with a first text element in the subtitle text to share the timestamp information of an audio fragment corresponding to the first text element.

For example, it is assumed that the subtitle text before inserting text is: I (00:00-00:01) had (00:01-00:02) a (00:02-00:04) good (00:04-00:05) time (00:05-00:06) today (00:06-00:07), where the brackets indicate the time stamp information of the audio segments corresponding to the text elements.

In case 1, after inserting a text element of "very" after the text element "a", the updated subtitle text is: I (00:00-00:01) had (00:01-00:02) a very (00:02-00:04) good (00:04-00:05) time (00:05-00:06) today (00:06-00:07), where the brackets indicate the time stamp information of the audio segments corresponding to the text elements.

In contrast, after inserting the new text element, "a very" share the timestamp information (00:02-00:04) of the audio fragment previously corresponding to "a".

In case 2, after inserting a new text element "Haha" in front of the text element "I", the updated subtitle text is: Haha I (00:00-00:01) had (00:01-00:02) a (00:02-00:04) good (00:04-00:05) time (00:05-00:06) today (00:06-00:07), where the brackets indicate the time stamp information of the audio segments corresponding to the text elements.

In contrast, after inserting the new text element, "Haha I" share the timestamp (00:00-00:01) of the audio fragment corresponding previously to "I".

S106: replacing, in response to a text replacement instruction, one or more text elements in the subtitle text with a replacement text to obtain an updated subtitle text.

Upon replacement, the timestamp information corresponding to the replacement text is equal to the timestamp information of the audio fragment corresponding to the replaced text element. In a replacement, the replacement text may include one or more text elements, and can be understood as a whole, and a number of the replaced text elements may also be one or more text elements in continuous positions.

For example, it is assumed that the subtitle text before text insertion is: I (00:00-00:01) had (00:01-00:02) a (00:02-00:04) good (00:04-00:05) time (00:05-00:06) today (00:06-00:07), where the brackets indicate the time stamp information of the audio segments corresponding to the text elements.

It is assumed that "good time" is replaced with a replacement text of "bad day", "today" is replaced with a replacement text of "actually", and the updated subtitle text after the replacement is: I (00:00-00:01) had (00:01-00:02) a (00:02-00:04) bad day (00:04-00:06) actually (00:06-00:07), where the brackets indicate the time stamp information of the audio segments corresponding to the text elements.

In contrast, after the replacement, "bad day" uses a sum (00:04-00:06) of the timestamps of both audio fragments previously respectively corresponding to "good" and "time"; "actually" uses the timestamp (00:06-00:07) of the audio fragment previously corresponding to "today".

One or more of the editing approaches described above may be selected to edit the subtitle text according to requirements.

S107: determining, according to the timestamp information of the audio fragments respectively corresponding to the respective text elements in the updated subtitle text, the material fragments in the multimedia material matching with the respective text elements.

S108: synthesizing the respective text elements respectively with the material fragments in the matching time period, so that a subtitle is re-added to the multimedia material.

Steps S107 to S108 are similar to the implementations of steps S102 and S103 in the foregoing embodiment shown in FIG. 1, respectively, and may refer to the detail description of the foregoing embodiment shown in FIG. 1.

If it is automatically implemented by calling a dynamic subtitle resource package, the updated subtitle text and the timestamp information of respective text elements included in the updated subtitle text are re-imported into the dynamic subtitle resource package, which re-applies preset subtitle animation styles to the respective text elements included in the updated subtitle text in batches, and superposes the text elements with preset subtitle animation styles on matching material fragments, so that a subtitle is re-added to the multimedia material.

The method of this embodiment can meet the user's requirement to adjust the subtitle's content when adding a subtitle to the multimedia material, and can automatically generate a subtitle with specified subtitle effects for the updated subtitle texts, which is convenient for the user to use and beneficial to improving user's experience.

Figure 3:
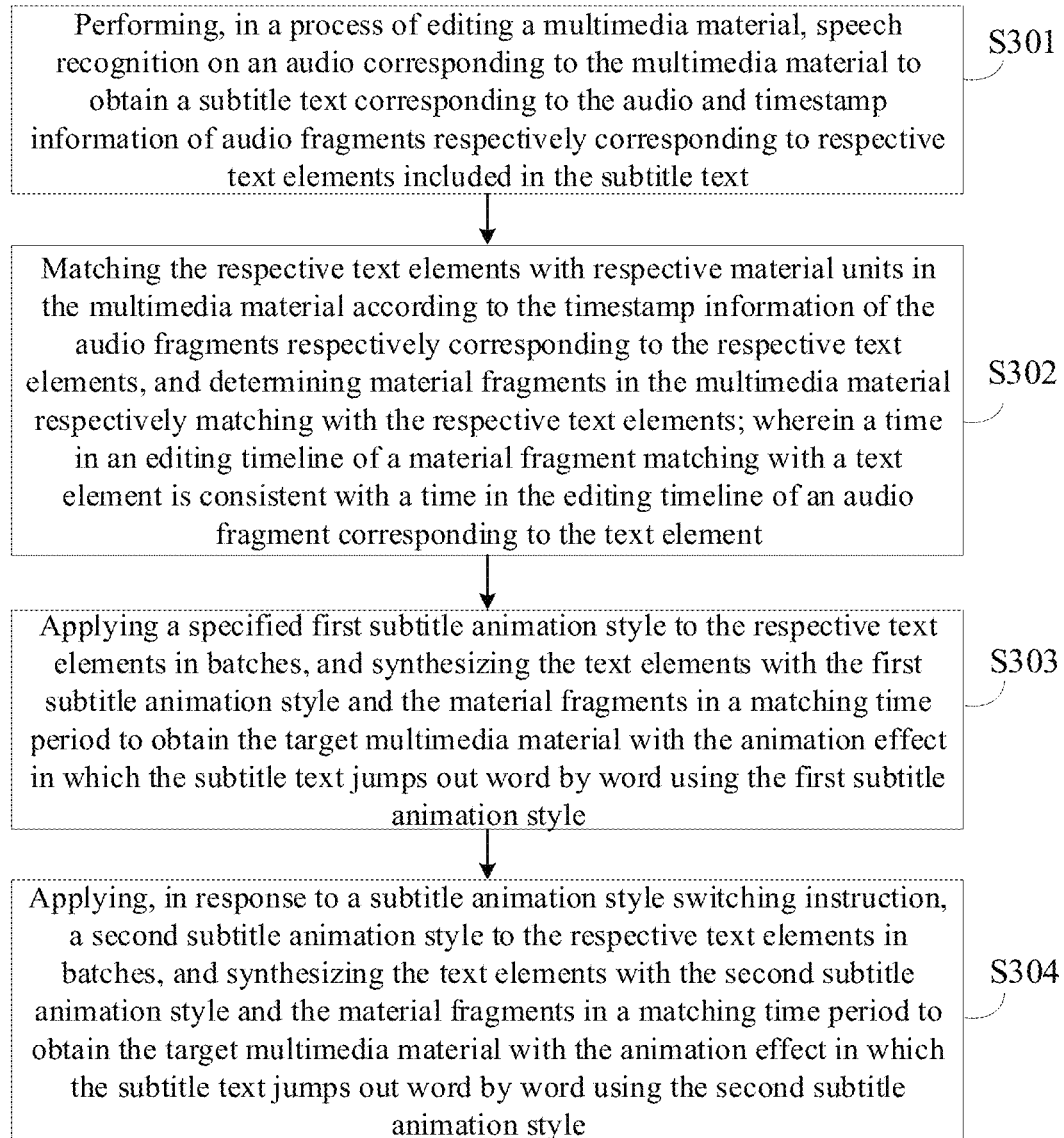
FIG. 3 is a flowchart for a subtitle processing method provided by another embodiment of the present disclosure.

After adding a subtitle to the multimedia material by the method of the embodiment shown in FIG. 1, the user may further adjust the subtitle animation style currently adopted in the subtitle, so as to obtain a subtitle effect that meets the user's expectation. FIG. 3 is a flowchart for a subtitle processing method provided by another embodiment of the present disclosure. Referring to FIG. 3, the method of this embodiment comprises:

S301: performing, in a process of editing multimedia material, speech recognition on an audio corresponding to the multimedia material to obtain a subtitle text corresponding to the audio and timestamp information of audio fragments respectively corresponding to respective text elements included in the subtitle text.

S302: matching the respective text elements with respective material units in the multimedia material according to the timestamp information of the audio fragments respectively corresponding to the respective text elements, and determining material fragments in the multimedia material respectively matching with the respective text elements; wherein a time in an editing timeline of a material fragment matching with the text element is consistent with a time in the editing timeline of an audio fragment corresponding to the text element.

S303: applying a specified first subtitle animation style to the respective text elements in batches, and synthesizing the text elements with the first subtitle animation style and the material fragments in the matching time period, to obtain a target multimedia material with an animation effect in which the subtitle text jumps out word by word in the first subtitle animation style.

Steps S301 to S302 in this embodiment are similar to steps S101 to S103 in the embodiment shown in FIG. 1, respectively, and may refer to the detail description of the embodiment shown in FIG. 1, which will not detailed here. It should be noted that the first subtitle animation style can be understood as a default subtitle animation style of the application program.

S304: applying, in response to a subtitle animation style switching instruction, a second subtitle animation style to the respective text elements in batches, and synthesizing the text elements with the second subtitle animation style and the material fragments in the matching time period, to obtain a target multimedia material with the animation effect in which the subtitle text jumps out word by word in the second subtitle animation style.

The application program may provide, to the user, a page edited with a subtitle animation style through the electronic device. One or more areas or controls corresponding to subtitle animation styles selectable for the user may be displayed in the page. The user may input the subtitle animation style switching instruction by operating the areas or controls corresponding to the subtitle animation styles.

If it is automatically implemented by calling a dynamic subtitle resource package, the updated subtitle text and the timestamp information of respective text elements included in the updated subtitle text are re-imported into the dynamic subtitle resource package, which re-applies a user-specified second subtitle animation style to the respective text elements included in the updated subtitle text in batches, and superposes the text elements with the second subtitle animation style on matching material fragments, so that a subtitle is re-added to the multimedia material.

The method of this embodiment can meet the user's requirement for later adjusting of subtitle effect, and can support batch editing of subtitle animation styles, resulting in efficient subtitle processing.

Based on the foregoing description, the embodiments of the present disclosure will illustrate the subtitle processing method provided by the present disclosure, by taking an electronic device as an example, in combination with the accompanying drawings and application scenarios. For convenience of explanation, in FIGS. 4A-4K, the electronic device is illustrated as a mobile phone in which a type of application program for video editing (referred to as application 1 for short) is installed. In addition, the multimedia material imported by the user into the application 1 is a video material.

Please refer to FIGS. 4A-4I, which are schematic diagrams for human-computer interaction interfaces provided by the embodiments of the present disclosure.

The application 1 may exemplarily display a user interface 11 as shown in FIG. 4A on the mobile phone. The user interface 11 is used to display an editing page for multimedia materials (hereinafter referred to as an editing page for short). The application 1 performs a certain collection of functions in the editing page, such as playing a clipping effect of multimedia material for preview, adding a background music to multimedia material, adding a filter, sticker or text to multimedia material, and so on.

Referring to FIG. 4A, the user interface 11 includes an area a1, which is a preview area of clipping effects of multimedia materials. The user interface 11 further includes an area a2 in which multimedia materials and other clipping materials added in the editing process may be shown according to the time axis. The user interface 11 further includes an area a3 in which various clipping functions may be provided to the user. For example, the area a3 includes a control 101, which is used to enter a text function collection page of the application 1. The text function collection page includes a plurality of controls corresponding to different text functions.

For example, after the application 1 receives a user's operation, such as clicking on the control 101, performed in the user interface 11 shown in FIG. 4A, the application 1 may exemplarily display a user interface 12 shown in FIG. 4B on the mobile phone. The user interface 12 shows a text function collection page provided by the application 1. The text function collection page may provide the user with entries for various text functions, through which the user may enter corresponding text function operation pages to add text contents to multimedia materials.

The user interface 12 includes an area a4, which includes entries respectively corresponding to a new text function, a text template function, a subtitle recognition function, lyric recognition function, a sticker function and a graffiti pen function. A control 102 shown in the user interface 12 is an entry corresponding to the subtitle recognition function.

Figure 4C:
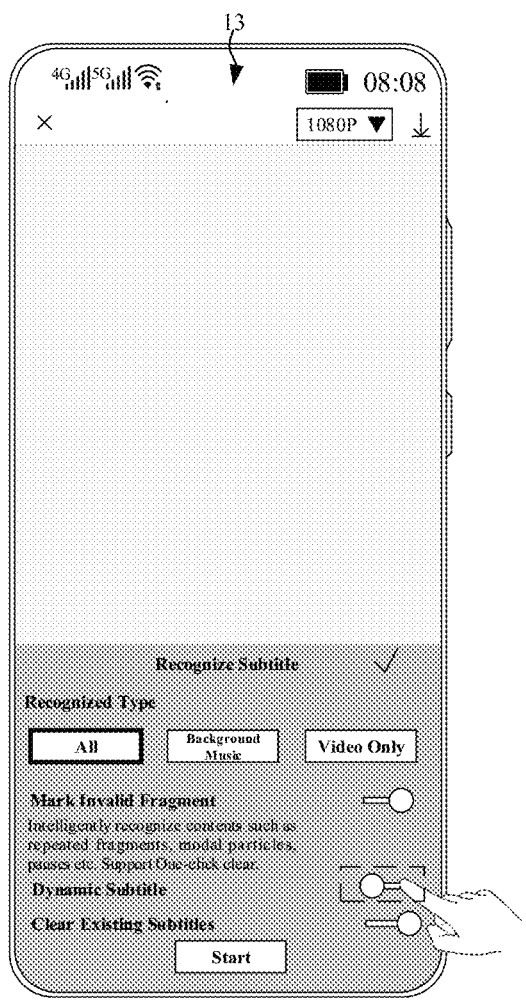

After receiving a user's operation, such as clicking on the control 102, performed in the user interface 12 shown in FIG. 4B, the application 1 may exemplarily display a user interface 13 shown in FIG. 4C on the mobile phone. The user interface 13 is used to show a subtitle recognition panel provided by the application 1. The subtitle recognition panel may provide the user with options for recognized types, entries for language category selection, a switch for marking invalid fragment, a switch for dynamic subtitle and a switch for simultaneously clearing an existing subtitle.

A dynamic subtitle means a function for adding, to multimedia material, a subtitle with an animation effect in which the subtitle text jumps out word by word. Specifically, when the switch for dynamic subtitle is in off state, the subtitle effect presented by the added subtitle appears in the form that statement fragments are a single piece of subtitle; and when the switch for dynamic subtitle is in on state, the subtitle effect presented by the added subtitle is the effect in which the subtitle text jumps out word by word, that is, the text elements in the subtitle text appear one by one and are displayed at the beginning of the corresponding audio fragment.

In some embodiments, user's choices may be remembered, so that when the subtitle recognition panel is turned on, the on-off state of dynamic subtitle when the user exited the subtitle recognition last time is displayed, which is more in line with the user's habits. When the function of dynamic subtitle is updated for the first time by the application 1, the switch for dynamic subtitle may be in off state, as shown in the user interface 13.

Figure 4D:
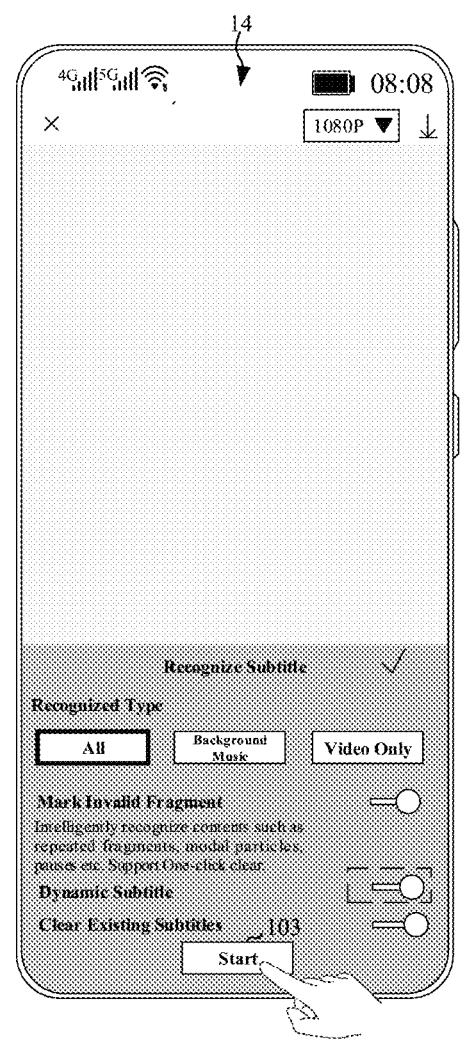

After receiving a user's operation, such as clicking on the switch button for dynamic subtitle, performed in the user interface 13 shown in FIG. 4C, the application 1 displays a user interface 14 shown in FIG. 4D, in which the on-off state of dynamic subtitle is on state.

Figure 4E:
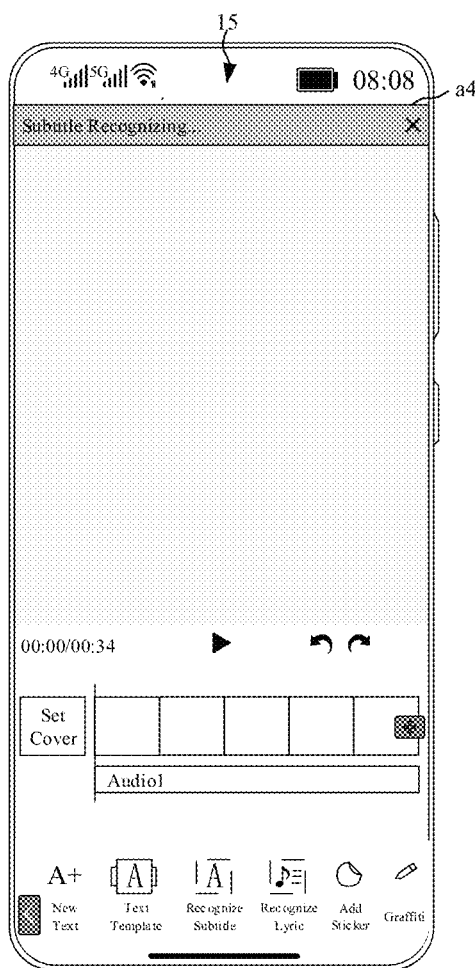

The user interface 14 further includes a control 103 for instructing to start speech recognition and to add a subtitle with an animation effect of jumping out word by word. After responding to a user's operation, such as clicking on the control 103, performed in the user interface 14, the application 1 exemplarily displays a user interface 15 as shown in FIG. 4E on the mobile phone. In the user interface 15, the subtitle recognition panel is off, and a prompt content, such as animation and prompt text, is displayed in the area a4 to remind the user that a dynamic subtitle animation is currently being created. In order to reduce the occlusion by the prompt animation and prompt text to the preview screen shown in the area a1, the area a4 may be positioned above the area a1. It should be understood that the area a4 may also be positioned at another position, which is not limited by the present disclosure.

In combination with the above, the user's switching on and off of the dynamic subtitle and operations on the control 103 trigger the application 1 to perform speech recognition on the audio corresponding to the multimedia material and automatically add the dynamic subtitle with the animation effect of jumping out word by word.

Figure 4F:
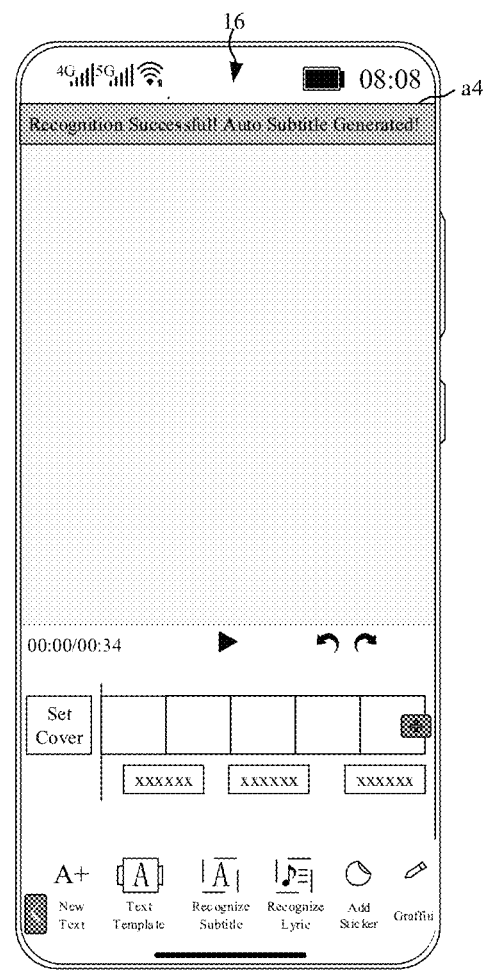

After the dynamic subtitle animation is created, the application 1 may exemplarily display a user interface 16 as shown in FIG. 4F on the mobile phone. In the user interface 16, a prompt content may be displayed in the area a4, for example, a prompt text of "Recognition Successful! Auto Subtitle Generated!"

Afterwards, the user may click on a preview play button to preview the subtitle effect in the area a1. If the effect meets the user's expectation, the edited multimedia material may be exported as a target video for publishing or saving.

In combination with the interaction process shown in FIG. 4A to FIG. 4F, the present disclosure provides the user with the switch for dynamic subtitle in the pre-stage of the subtitle recognition, which is more convenient for the user to use. Moreover, the on-off state of the switch for dynamic subtitle when the user exits the subtitle recognition panel last time is memorized, so that the user does not need to operate when using it again, thereby further improving efficiency in use, and the user does not need to perform too many operations.

In order to better meet the user's requirements, the application 1 further provides the user with a function for adding a dynamic subtitle or modifying animation style of an existing subtitle in the post-stage.

Figure 4G:
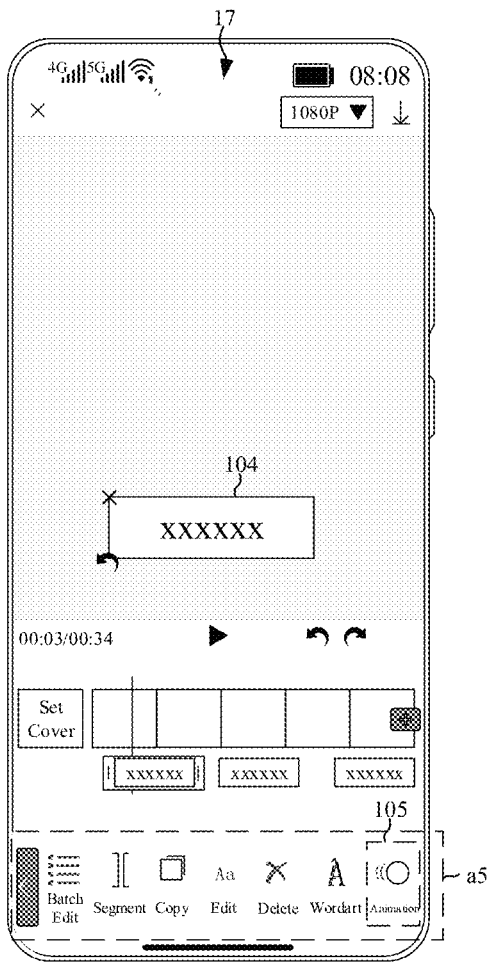

For example, on the basis of the user interface 16 shown in FIG. 4F, the logos respectively corresponding to the multimedia material and the subtitle text are shown in the area a2 according to the time axis. The re-editing of the subtitle may be triggered by operating (such as clicking) on the logo for the subtitle text shown in the area a2. Upon reception of a user's click operation on a text fragment contained in any subtitle in the area a2 of the user interface 16, the application 1 may exemplarily display a user interface 17 as shown in FIG. 4G on the mobile phone.

In the user interface 17, a text box 104 corresponding to the subtitle text is displayed in the area a1. The text box 104 contains the text content corresponding to the current preview position, which may be one or more statements (i.e., text fragments). Moreover, controls for operating on the text box may also be displayed in the area a1, such as rotating and copying. The user may also trigger enlarging or reducing the size of the text box with two fingers, and the size of text elements in the text box may also change with the change in the size of the text box. The user interface 17 further includes an area a5 used to display an area for a subtitle editing function collection page, which provides entries for various editing functions for editing a currently added subtitle, and may include, for example: entries respectively corresponding to functions such as batch editing subtitle, subtitle segmentation, copying subtitle, editing subtitle, deleting subtitle, wordart and subtitle animation style, etc. The user interface 17 contains a control 105, which is used to enter a subtitle animation panel to add a subtitle effect (including a dynamic subtitle effect) to the current subtitle or modify the subtitle animation style adopted in the current subtitle.

Figure 4H:
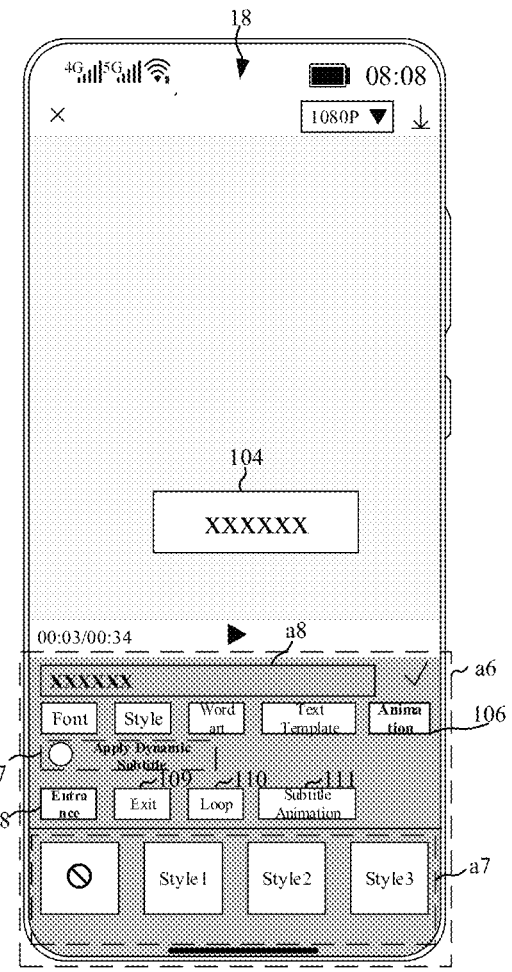

After receiving a user's operation, such as clicking on the control 105, performed in the user interface 17, the application 1 displays a user interface 18 as shown in FIG. 4H. The user interface 18 includes an area a6.

The area a6 is used to show the subtitle animation panel, which includes a label 106 for setting animation style, as well as a font label, a style label, a wordart label, a text template label and the like. In some embodiments, as shown in FIG. 4H, the label 106 may be selected by default when entering the subtitle animation style panel, and the content related to the label 106 may be displayed. In other embodiments, other labels may be selected. The application 1 displays the content related to the label 106 after receiving the user's click operation on the label 106.

Referring to FIG. 4H, the area a6 further includes a dynamic subtitle switch 107, which may be operated to add a subtitle effect in which the text elements display one by one to the current subtitle.

In some embodiments, if the user has added a dynamic subtitle in the pre-stage, it may be displayed as open state here; or if the user did not use the dynamic subtitle in the pre-stage, it may be displayed as off state here. The user may switch the on-off state of the dynamic subtitle switch 107 displayed in the user interface 18 to be on state. In the embodiment shown in FIG. 4H, the dynamic subtitle switch 107 is in off state.

In addition, the area a6 further includes a label 108 for setting a subtitle entrance style, a label 109 for setting a subtitle exit style, a label 110 for setting subtitle loop style, a label 111 for setting dynamic subtitle animation style, and an area a7, wherein the area a7 is used to display the content of the corresponding label according to the currently selected label. In some cases, when the dynamic subtitle switch 107 is in off state, the content related to any of the labels may be displayed by default, for example, the user interface 17 shown in FIG. 4H displays the related content corresponding to the label 108 by default.

Figure 4I:
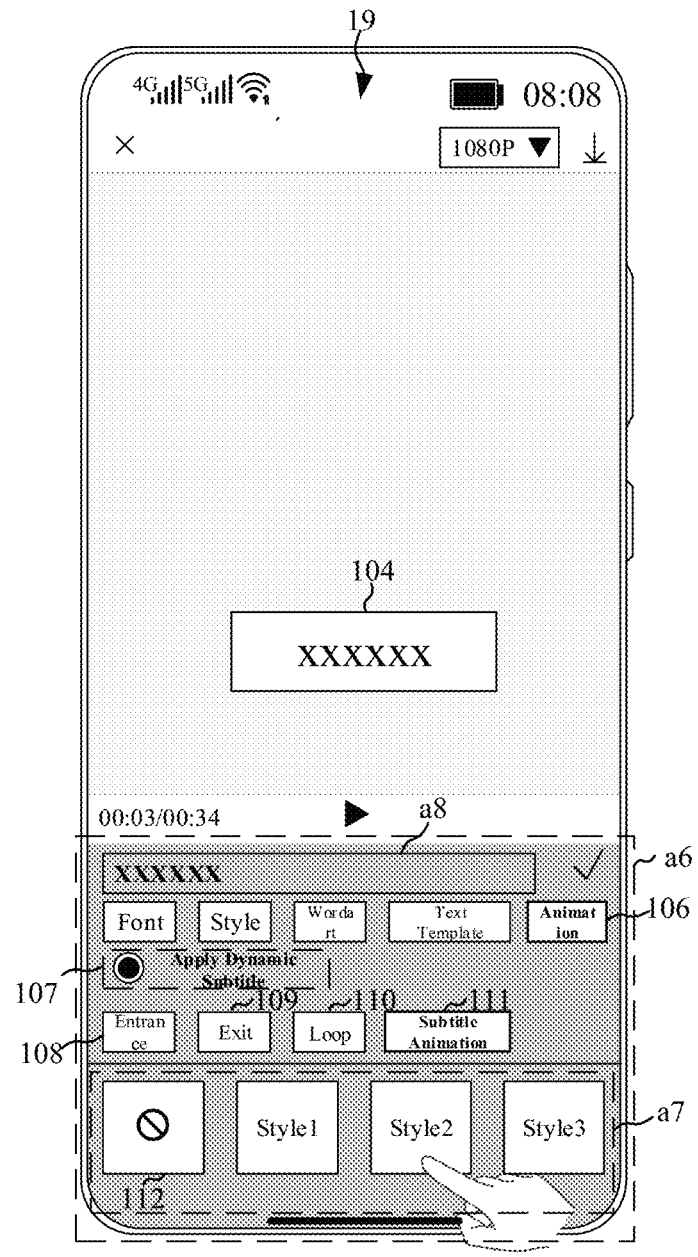

When the application 1 receives a user's operation (such as clicking operation) performed on the dynamic subtitle switch 107 in the user interface 18, and the dynamic subtitle switch 107 is switched from off state to on state, the application 1 may exemplarily display a user interface 19 as shown in FIG. 4I on the mobile phone. Referring to FIG. 4I, in the user interface 19, the dynamic subtitle switch 107 is in on state and the label 111 is in selected state. The area a7 is used to display one or more dynamic subtitle animation styles, selectable for the user, related to a dynamic subtitle. The displayed logos corresponding to various dynamic subtitle animation styles may be arranged sequentially from left to right, which may be viewed by the user back and forth by sliding the screen left and right. The default dynamic subtitle animation style in the application 1 may display the first position from left to right, so that the user can clearly understand which dynamic subtitle animation style is used by the application 1 by default.

The area a7 may further include a disable button 112 which may be disposed on the leftmost side of the area a7, or of course may be disposed in another position, which is not limited by the present disclosure. When the user clicks on the disable button 112 to accordingly turn off the dynamic subtitle effect, the dynamic subtitle switch 107 may switch to off state.

It is assumed that the user clicks on the second dynamic subtitle animation style from left to right in the area a7, which is equivalent to inputting a subtitle animation style switching instruction to the application 1, and the application 1, in response to the subtitle animation style switching instruction, applies the second dynamic subtitle style to respective text elements included in the subtitle text. The user may switch dynamic subtitle animation styles for many times until an expected subtitle effect is achieved.

On the basis of the user interface 18 shown in FIG. 4H and the user interface 19 shown in FIG. 4I, the area a5 further includes an area a8 used to show a text editing box, through which the user may delete a text element in subtitle text, insert a new text or replace a previous text element. The user's operation on the text editing box is equivalent to inputting a deletion instruction, an insertion instruction and a replacement instruction to the application 1. When editing the text content in the text editing box in the area a8, the edited text content is shown synchronously in the text box 104 in the area a1, which is beneficial for the user to preview the edited subtitle content and the displayed effect of the subtitle content in the video frame image of the multimedia material fragment.

Through the embodiments shown in FIGS. 4F to 4I, a switch for dynamic subtitle and a label for dynamic subtitle animation style are disposed in the subtitle animation style panel in the post-stage, so that the user's requirements for adding a dynamic subtitle in the post-stage and adjusting the subtitle dynamic style adopted in the dynamic subtitle are met.

It should be noted that the schematic diagrams for the interaction interfaces shown in FIGS. 4A to 4I above are not limitations to the subtitle processing method provided by the present disclosure, and it should also be understood that the styles and triggering modes of some controls, panels and labels can be flexibly adjusted on demand.

Figure 5:
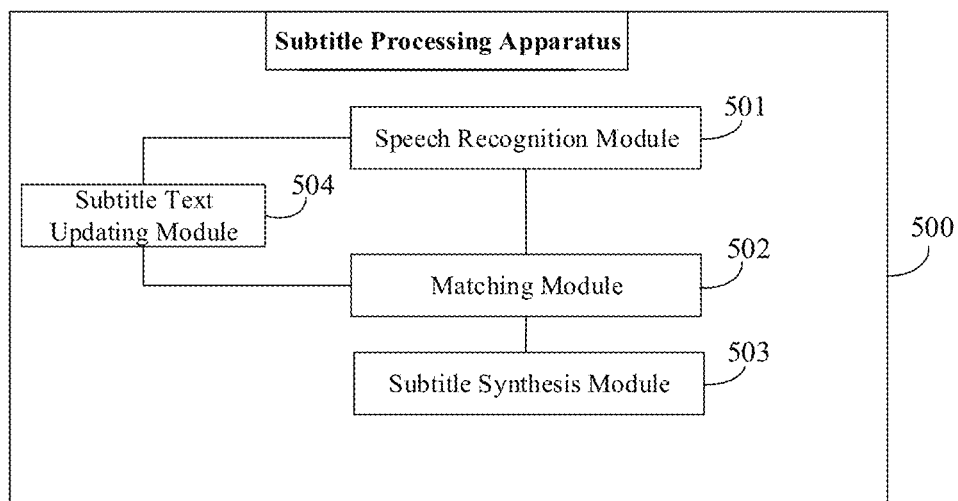
FIG. 5 is a schematic structural diagram for a subtitle processing apparatus provided by an embodiment of the present disclosure.

FIG. 5 is a schematic structural diagram for a subtitle processing apparatus provided by an embodiment of the present disclosure. As shown in FIG. 5, the apparatus 500 provided by this embodiment comprises:

a speech recognition module 501, used to perform, in a process of editing multimedia material, speech recognition on an audio corresponding to the multimedia material, to obtain a subtitle text corresponding to the audio and timestamp information of audio fragments respectively corresponding to respective text elements included in the subtitle text;

a matching module 502, used to match the respective text elements with respective material units in the multimedia material according to the timestamp information of the audio fragments respectively corresponding to the respective text elements, and determine material fragments in the multimedia material respectively matching with the respective text elements; wherein a time in an editing timeline of a material fragment matching with the text element is consistent with a time in the editing timeline of an audio fragment corresponding to the text element; and a subtitle synthesis module 503, used to synthesize the respective text elements respectively with the material fragments in a matching time range, to obtain a target multimedia material with an animation effect in which the subtitle text jumps out word by word.

In some embodiments, in the editing timeline, the starting moment of a time period to which the material fragment matching with the text element belongs is consistent with the starting moment of the audio fragment corresponding to the text element; and in the editing timeline, the ending moment of the time period of the material fragment matching with the text element belongs is consistent with the ending moment of the audio fragment corresponding to the text element, or alternatively, the ending moment of the time period to which the material fragment matching the text element belongs is later than the ending moment of the audio fragment corresponding to the text element.

In some embodiments, the subtitle synthesis module 503 is specifically used to apply a specified first subtitle animation style to the respective text elements in batches, and synthesize the text elements with the first subtitle animation style and the material fragments in the matching time period to obtain the target multimedia material with the animation effect in which the subtitle text jumps out word by word in the first subtitle animation style.

Optionally, the apparatus 500 further comprises a subtitle text updating module 504.

In some embodiments, the subtitle text updating module 504 is used to delete, in response to a text deletion instruction, corresponding text elements from the subtitle text to obtain an updated subtitle text.

Correspondingly, the matching module 502 is further used to determine, according to the timestamp information of the audio fragments respectively corresponding to the respective text elements in the updated subtitle text, the material fragments in the multimedia material matching with the respective text elements.

The subtitle synthesis module 503 is further used to synthesize the respective text elements included in the updated subtitle text respectively with the material fragments in the matching time period, so that a subtitle with the animation effect in which the subtitle text jumps out word by word is re-added to the multimedia material.

In some embodiments, the subtitle text updating module 504 is further used to insert, in response to a text insertion instruction, a new text element into the subtitle text to obtain an updated subtitle text.

Correspondingly, the matching module 502 is further used to match the respective text elements with the respective material units in the multimedia material according to the timestamp information of the audio fragments respectively corresponding to the respective text elements in the updated subtitle text, and determine the material fragments in the multimedia material respectively matching with the respective text elements; wherein, the new text element is merged with an adjacent text element, and shares the timestamp information of an audio fragment corresponding to the adjacent text element with the adjacent text element.

The subtitle synthesis module 503 is further used to synthesize the respective text elements included in the updated subtitle text respectively with the material fragments in the matching time range, so that a subtitle with the animation effect in which the subtitle text jumps out word by word is re-added to the multimedia material.

In some embodiments, if a position where the new text element is inserted is at the very beginning of the subtitle text, the new text element is merged with a first text element in the subtitle text to share the timestamp information of an audio fragment corresponding to the first text element; and if the position where the new text element is inserted is in the middle or at the end of the subtitle text, the new text element is merged with an adjacent previous text element to share the timestamp information of an audio fragment corresponding to the previous text element.

In some embodiments, the subtitle text updating module 504 is further used to replace, in response to a text replacement instruction, one or more text elements in the subtitle text with a replacement text to obtain an updated subtitle text.

Correspondingly, the matching module 502 is further used to determine, according to the timestamp information of the audio fragments respectively corresponding to the respective text elements in the updated subtitle text, the material fragments in the multimedia material matching with the respective text elements; wherein the replacement text corresponds to the timestamp information of an audio fragment corresponding to the replaced text element.

The subtitle synthesis module 503 is further used to synthesize the respective text elements included in the updated subtitle text respectively with the material fragments in the matching time period, so that a subtitle with the animation effect in which the subtitle text jumps out word by word is re-added to the multimedia material.

In some embodiments, the subtitle synthesis module 503 is further used to apply, in response to a subtitle animation style switching instruction, a second subtitle animation style to the respective text elements in batches, and synthesize the text elements with the second subtitle animation style and the material fragments in the matching time range, to obtain the target multimedia material with the animation effect in which the subtitle text jumps out word by word in the second subtitle animation style.

In some embodiments, the audio corresponding to the multimedia material is an original audio included in the multimedia material or a background music added to the multimedia material.

The subtitle processing apparatus provided by this embodiment may be used to implement the technical scheme of any of the foregoing method embodiments with similar implementation principle and technical effect, and may refer to the detailed description of the foregoing method embodiments, which, for the sake of brevity, will not be detailed here.

For example, the present disclosure provides an electronic device comprising: one or more processors; a memory; and one or more computer programs; wherein the one or more computer programs are stored in the memory; the one or more processors, when executing the one or more computer programs, cause the electronic device to implement the subtitle processing method of the previous embodiments.

For example, the present disclosure provides a chip system, which is applied to an electronic device comprising a memory and a sensor; the chip system comprises: a processor which is configured to execute the subtitle processing method of the previous embodiments.

For example, the present disclosure provides a computer-readable storage medium having stored thereon a computer program, which, when executed by a processor, causes an electronic device to implement the subtitle processing method of the previous embodiments.

For example, the present disclosure provides a computer program product which, when executed on a computer, causes the computer to execute the subtitle processing method of the previous embodiments.

It should be noted that, herein, relational terms such as "first" and "second" are merely used to distinguish one entity or operation from another, and do not necessarily require or imply that there is any such actual relationship or order between the entities or operations. Moreover, the terms "include", "contain" or any other variation thereof are intended to encompass non-exclusive inclusion, so that a process, method, article or device including a series of elements includes not only those elements, but also other elements not explicitly listed or elements inherent to such process, method, article or device. Without further limitations, an element defined by a phrase of "including one . . . " does not exclude, in the process, method, article or device including this element, the existence of another identical element.

What has been described above is only the specific implementation of the present disclosure, so that those skilled in the art can understand or implement the present disclosure. Many modifications to these embodiments will be obvious to those skilled in the art, and the general principles defined herein can be implemented in other embodiments without departing from the spirit or scope of the present disclosure. Therefore, the present disclosure will not be limited to these embodiments described herein, but is to conform to the widest scope consistent with the principles and novel features disclosed herein.

What is claimed is:

1. A subtitle processing method, comprising:
performing, in a process of editing multimedia material, speech recognition on an audio corresponding to the multimedia material, to obtain a subtitle text corresponding to the audio and timestamp information of audio fragments respectively corresponding to respective text elements included in the subtitle text, wherein each of the text elements is a word;
matching with respective material units in the multimedia material according to the timestamp information of the audio fragments respectively corresponding to the respective text elements, and determining material fragments in the multimedia material respectively matching with the respective text elements; wherein a time in an editing timeline of a material fragment matching with a text element is consistent with a time in the editing timeline of an audio fragment corresponding to the text element; and
synthesizing the respective text elements respectively with material fragments in a matching time period to obtain a target multimedia material with an animation effect in which the subtitle text jumps out word by word,
wherein the synthesizing the respective text elements respectively with the material fragments in the matching time period to obtain the target multimedia material with the animation effect in which the subtitle text jumps out word by word comprises:
  applying a specified first subtitle animation style to the respective text elements in batches, and synthesizing the text elements with the first subtitle animation style and the material fragments in the matching time period, to obtain the target multimedia material with the animation effect in which the subtitle text jumps out word by word in the first subtitle animation style.

2. The method according to claim 1, wherein, in the editing timeline, a starting moment of a time period to which the material fragment matching with the text element belongs is consistent with a starting moment of the audio fragment corresponding to the text element; and in the editing timeline, an ending moment of the time period of the material fragment matching with the text element belongs is consistent with an ending moment of the audio fragment corresponding to the text element, or the ending moment of the time period to which the material fragment matching the text element belongs is later than the ending moment of the audio fragment corresponding to the text element.

3. The method according to claim 1, further comprising:
  deleting, in response to a text deletion instruction, a corresponding text element from the subtitle text to obtain an updated subtitle text;
  determining, according to timestamp information of audio fragments respectively corresponding to respective text elements in the updated subtitle text, the material fragments in the multimedia material matching with the respective text elements;
  synthesizing the respective text elements included in the updated subtitle text respectively with material fragments in a matching time period, so that a subtitle with the animation effect in which the subtitle text jumps out word by word is re-added to the multimedia material.

4. The method according to claim 1, further comprising:
  inserting, in response to a text insertion instruction, a new text element into the subtitle text to obtain an updated subtitle text;
  matching with the respective material units in the multimedia material according to timestamp information of audio fragments respectively corresponding to respective text elements in the updated subtitle text, and determining the material fragments in the multimedia material respectively matching with the respective text elements; wherein, the new text element is merged with an adjacent text element and shares timestamp information of an audio fragment corresponding to the adjacent text element with the adjacent text element;
  synthesizing the respective text elements included in the updated subtitle text respectively with the material fragments in a matching time range, so that a subtitle with the animation effect in which the subtitle text jumps out word by word is re-added to the multimedia material.

5. The method according to claim 4, wherein, if a position where the new text element is inserted is at a very beginning of the subtitle text, the new text element is merged with a first text element in the subtitle text to share timestamp information of an audio fragment corresponding to the first text element; and
  if the position where the new text element is inserted is in the middle or at the end of the subtitle text, the new text element is merged with an adjacent previous text element to share timestamp information of an audio fragment corresponding to the previous text element.

6. The method according to claim 1, further comprising:
  replacing, in response to a text replacement instruction, one or more text elements in the subtitle text with a replacement text to obtain an updated subtitle text;
  determining, according to timestamp information of audio fragments respectively corresponding to respective text elements in the updated subtitle text, material fragments in the multimedia material matching with the respective text elements; wherein the replacement text corresponds to timestamp information of an audio fragment corresponding to the replaced text element;
  synthesizing the respective text elements included in the updated subtitle text respectively with the material fragments in the matching time period, so that a subtitle with the animation effect in which the subtitle text jumps out word by word is re-added to the multimedia material.

7. The method according to claim 1, further comprising:
  applying, in response to a subtitle animation style switching instruction, a second subtitle animation style to the respective text elements in batches, and synthesizing the text elements with the second subtitle animation style and the material fragments in a matching time range to obtain the target multimedia material with the animation effect in which the subtitle text jumps out word by word in the second subtitle animation style.

8. The method according to claim 1, wherein the audio corresponding to the multimedia material is an original audio included in the multimedia material or a background music added to the multimedia material.

9. An electronic device comprising a memory and a processor, wherein,
  the memory is configured to store computer program instructions;
  the processor is configured to execute the computer program instructions to cause the electronic device to implement a subtitle processing method, which comprises:
  performing, in a process of editing multimedia material, speech recognition on an audio corresponding to the multimedia material, to obtain a subtitle text corresponding to the audio and timestamp information of audio fragments respectively corresponding to respective text elements included in the subtitle text, wherein each of the text elements is a word;
  matching with respective material units in the multimedia material according to the timestamp information of the audio fragments respectively corresponding to the respective text elements, and determining material fragments in the multimedia material respectively matching with the respective text elements; wherein a time in an editing timeline of a material fragment matching with a text element is consistent with a time in the editing timeline of an audio fragment corresponding to the text element; and
  synthesizing the respective text elements respectively with material fragments in a matching time period to obtain a target multimedia material with an animation effect in which the subtitle text jumps out word by word,
  wherein the synthesizing the respective text elements respectively with the material fragments in the matching time period to obtain the target multimedia material with the animation effect in which the subtitle text jumps out word by word comprises:
  applying a specified first subtitle animation style to the respective text elements in batches, and synthesizing the text elements with the first subtitle animation style and the material fragments in the matching time period, to obtain the target multimedia material with the animation effect in which the subtitle text jumps out word by word in the first subtitle animation style.

10. The electronic device according to claim 9, wherein, in the editing timeline, a starting moment of a time period to which the material fragment matching with the text element belongs is consistent with a starting moment of the audio fragment corresponding to the text element; and in the editing timeline, an ending moment of the time period of the material fragment matching with the text element belongs is consistent with an ending moment of the audio fragment corresponding to the text element, or the ending moment of the time period to which the material fragment matching the text element belongs is later than the ending moment of the audio fragment corresponding to the text element.

11. The electronic device according to claim 9, wherein the subtitle processing method further comprises:
  deleting, in response to a text deletion instruction, a corresponding text element from the subtitle text to obtain an updated subtitle text;
  determining, according to timestamp information of audio fragments respectively corresponding to respective text elements in the updated subtitle text, the material fragments in the multimedia material matching with the respective text elements;
  synthesizing the respective text elements included in the updated subtitle text respectively with material fragments in a matching time period, so that a subtitle with the animation effect in which the subtitle text jumps out word by word is re-added to the multimedia material.

12. The electronic device according to claim 9, wherein the subtitle processing method further comprises:
  inserting, in response to a text insertion instruction, a new text element into the subtitle text to obtain an updated subtitle text;
  matching with respective material units in the multimedia material according to timestamp information of audio fragments respectively corresponding to respective text elements in the updated subtitle text, and determining the material fragments in the multimedia material respectively matching with the respective text elements; wherein, the new text element is merged with an adjacent text element and shares timestamp information of an audio fragment corresponding to the adjacent text element with the adjacent text element;
  synthesizing the respective text elements included in the updated subtitle text respectively with the material fragments in a matching time range, so that a subtitle with the animation effect in which the subtitle text jumps out word by word is re-added to the multimedia material.

13. The electronic device according to claim 12, wherein, if a position where the new text element is inserted is at a very beginning of the subtitle text, the new text element is merged with a first text element in the subtitle text to share timestamp information of an audio fragment corresponding to the first text element; and
  if the position where the new text element is inserted is in the middle or at the end of the subtitle text, the new text element is merged with an adjacent previous text element to share timestamp information of an audio fragment corresponding to the previous text element.

14. The electronic device according to claim 9, wherein the subtitle processing method further comprises:
  replacing, in response to a text replacement instruction, one or more text elements in the subtitle text with a replacement text to obtain an updated subtitle text;
  determining, according to timestamp information of audio fragments respectively corresponding to respective text elements in the updated subtitle text, material fragments in the multimedia material matching with the respective text elements; wherein the replacement text corresponds to timestamp information of an audio fragment corresponding to the replaced text element;
  synthesizing the respective text elements included in the updated subtitle text respectively with the material fragments in the matching time period, so that a subtitle with the animation effect in which the subtitle text jumps out word by word is re-added to the multimedia material.

15. The electronic device according to claim 9, wherein the subtitle processing method further comprises:
  applying, in response to a subtitle animation style switching instruction, a second subtitle animation style to the respective text elements in batches, and synthesizing the text elements with the second subtitle animation style and the material fragments in a matching time range to obtain the target multimedia material with the animation effect in which the subtitle text jumps out word by word in the second subtitle animation style.

16. The electronic device according to claim 9, wherein the audio corresponding to the multimedia material is an original audio included in the multimedia material or a background music added to the multimedia material.

17. A non-transitory storage medium comprising computer program instructions, wherein,
  upon at least one processor of an electronic device executing the computer program instructions, the computer program instructions cause the electronic device to implement a subtitle processing method, which comprises:
  performing, in a process of editing multimedia material, speech recognition on an audio corresponding to the multimedia material, to obtain a subtitle text corresponding to the audio and timestamp information of audio fragments respectively corresponding to respective text elements included in the subtitle text, wherein each of the text elements is a word;
  matching with respective material units in the multimedia material according to the timestamp information of the audio fragments respectively corresponding to the respective text elements, and determining material fragments in the multimedia material respectively matching with the respective text elements; wherein a time in an editing timeline of a material fragment matching with a text element is consistent with a time in the editing timeline of an audio fragment corresponding to the text element; and
  synthesizing the respective text elements respectively with material fragments in a matching time period to obtain a target multimedia material with an animation effect in which the subtitle text jumps out word by word,
  wherein the synthesizing the respective text elements respectively with the material fragments in the matching time period to obtain the target multimedia material with the animation effect in which the subtitle text jumps out word by word comprises:
  applying a specified first subtitle animation style to the respective text elements in batches, and synthesizing the text elements with the first subtitle animation style and the material fragments in the matching time period, to obtain the target multimedia material with the animation effect in which the subtitle text jumps out word by word in the first subtitle animation style.

18. The non-transitory storage medium according to claim 17, wherein, in the editing timeline, a starting moment of a time period to which the material fragment matching with the text element belongs is consistent with a starting moment of the audio fragment corresponding to the text element; and in the editing timeline, an ending moment of the time period of the material fragment matching with the text element belongs is consistent with an ending moment of the audio fragment corresponding to the text element, or the ending moment of the time period to which the material fragment matching the text element belongs is later than the ending moment of the audio fragment corresponding to the text element.

\* \* \* \* \*